June 10, 1947.                B. COOPER                2,421,995
                        ELECTRIC CONTROL CIRCUIT
                           Filed Nov. 1, 1943
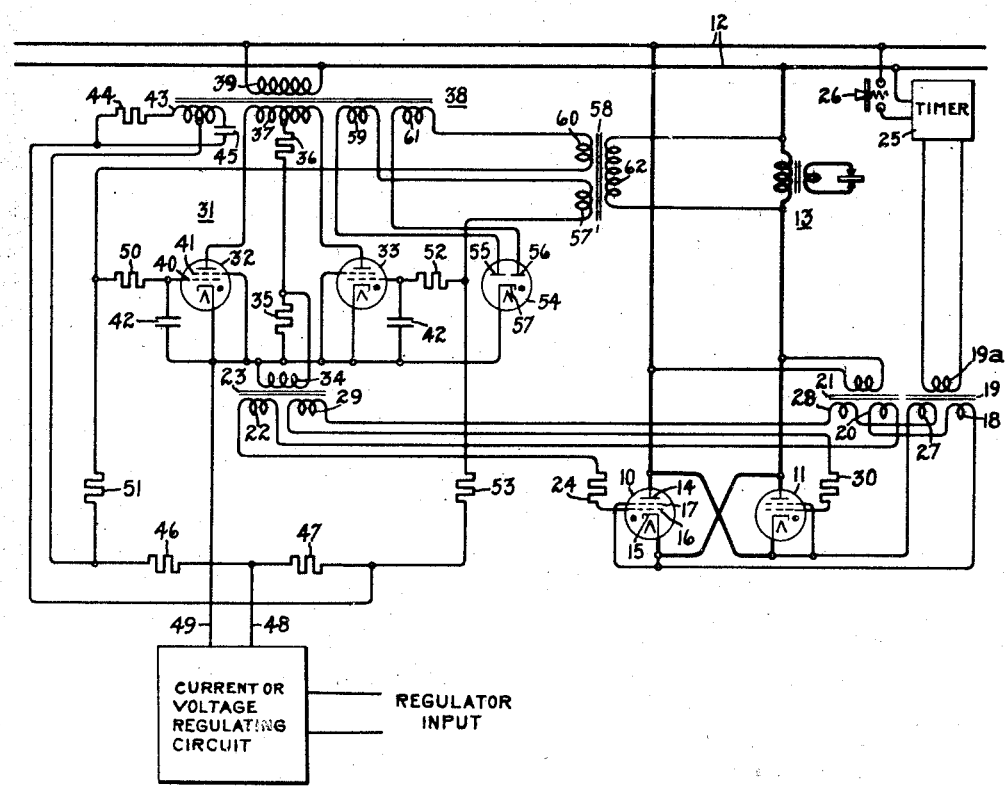
Inventor:
Benjamin Cooper,
by Harry E. Dunham
His Attorney.

Patented June 10, 1947

2,421,995

UNITED STATES PATENT OFFICE 2,421,995

ELECTRIC CONTROL CIRCUIT

Benjamin Cooper, Scotia, N. Y., assignor to General Electric Company, a corporation of New York Application November 1, 1943, Serial No. 508,611

7 Claims. (Cl. 250—27)

My invention relates to electric control circuits and more particularly to an improved control circuit for electric valve means. While not limited thereto, my invention is particularly well adapted for controlling electric valve means connected between an alternating current supply circuit and a load circuit, such as a welding transformer, to supply alternating current of a adjustable and regulated magnitude thereto.

In electric valve circuits for controlling the energization of the welding transformer of a resistance welding system, for example, reversely connected electric valve means have been widely used for supplying alternating current of adjustable magnitude to the welding transformer. The electric valves may be controlled by a periodic voltage of peaked wave form which controls the instant in the positive anode voltage cycle of the valve at which it is rendered conductive. If the voltage of peaked wave form is impressed on the control member before the anode voltage has become positive, it is impossible to initiate conduction in the valve, and if the periodic voltage disappears before the anode voltage becomes positive, the entire half cycle of energization of the load circuit will be omitted. This results in unidirectional magnetization of the welding transformer and as a result in the supply of unequal amounts of welding current to the work during successive weld periods.

In accordance with the teachings of my invention, I provide a new and improved control circuit particularly adapted for use in connection with control systems for resistance welders which prevents the advancement of the periodic voltages of peaked wave form, which are employed for voltage or heat control, beyond the power factor angle of the load circuit in order to insure that each of the reversely connected valves is rendered conducting.

It is an object of my invention to provide a new and improved electric control circuit.

It is another object of my invention to provide a new and improved electric control circuit for controlling the energiaztion of reversely connected electric valve means by means of periodic voltages of peaked wave form.

It is still another object of my invention to provide a new and improved control circuit for controlling the energiaztion of reversely connected electric valve means which precludes the application of the peaked control or firing voltage to the control members in advance of the power factor angle of the load circuit.

In accordance with the illustrated embodiment of my invention, a pair of reversely connected electric valve means are connected between an alternating current supply circuit and a welding transformer to supply pulses of current thereto during predetermined intervals, and to render the electric valves conductive at predetermined instants in the supply circuit voltage to determine the magnitude of the current supplied to the load circuit. The instant at which the electric valves are rendered conductive is controlled by an excitation circuit including a pair of electric valves which are rendered conductive to shock excite the primary winding of a peaking transformer. The instant at which the last mentioned electric valves are rendered conductive to establish the voltages of peaked wave form is controlled by a unidirectional voltage which may be derived from a voltage regulating or current regulating circuit. In order to prevent the generation of voltages of peaked wave form at an earlier point in the anode-cathode voltage than the power factor angle, I provide a restraining circuit for impressing a negative voltage on the control members of these electric valves until the current in the load circuit decreases to zero, indicating that the voltage has reversed on the other of the reversely connected electric valves. In this way any variation of the unidirectional regulating voltage tending to advance the phase of the peaked voltages supplied to the control members of the reversely connected electric valves ahead of the power factor angle position is prevented.

My invention will be better understood by reference to the following description taken in connection with the accompanying drawing, and its scope will be pointed out in the appended claims. In the drawing, the single figure is a schematic representation of one embodiment of my invention.

Referring now to the drawing, I have shown my invention embodied in a control circuit for controlling the conductivity of a pair of electric valve means 10 and 11 which are reversely connected in parallel between an alternating current supply circuit 12 and a load circuit, such as a welding transformer 13. The electric valve means 10 and 11 may be of any of the types well known in the art and, as illustrated, each comprises an anode 14, a cathode 15, a control member or grid 16 and a shield grid 17. The electrodes are mounted within an envelope which is preferably filled with an ionizable medium such as a gas or a vapor. The conductivities of the electric valves 10 and 11 are controlled in accordance with the resultant of three voltages which are impressed on the control members 16 thereof. As illustrated in the drawing, the cathode-to-control member circuit of the electric valve 10 is completed through a secondary winding 18 of a transformer 19, a secondary winding 20 of a transformer 21, a secondary winding 22 of a transformer 23 and a current limiting resistor 24. The transformer 23 is preferably a peaking transformer of the self-saturating type. The transformer 19 supplies an alternating current voltage component which is in phase with the anode voltage of the electric valve 10 and which appears intermittently under the control of a timer illustrated generally by the numeral 25 and connected to energize the primary winding 19a of transformer 19. The timer may, as illustrated, be energized from the alternating current supply 12 through an initiating switch 26. The secondary winding 20 of transformer 21 continuously impresses an alternating current voltage on control members 17 which is in phase opposition with the anode voltage of the electric valve 10. The secondary winding 22 of transformer 23 impresses a peaked voltage on the control members 17 to determine the instant in the anode-cathode voltage wave at which the electric valve is rendered conductive. The relative magnitudes of the voltages impressed on the control members 17 by transformer windings 18, 20 and 22 are such that both the peaked voltage of the winding 22 and the alternating current turn-on voltage of the winding 18 are required to render the electric valve conductive. In this way, the number of cycles during which the electric valve 10 conducts is determined by the timer control and the instant in each voltage wave that conduction is initiated is determined by the phase position of the peaked voltage of winding 22. In a similar way, the cathode-to-control member circuit of electric valve 11 includes a winding 27 of transformer 19, a winding 28 of transformer 20 and a winding 29 of transformer 23 and a current limiting resistor 30.

The phase position of the peaked voltages produced by the secondary windings 22 and 29 of transformer 23 is determined by a phase shifting circuit illustrated generally by the numeral 31 and including a pair of electric valve means 32 and 33 which are connected with the primary winding 34 of the transformer 23 suddenly to impress an alternating current voltage thereon at the instant conduction is initiated in either of the valves. The primary winding 34 is connected across a resistor 35 and in series with a resistor 36 which is connected to the midpoint of a transformer secondary winding 37 of a transformer 38. The primary winding 39 of the transformer 38 is energized from the alternating current supply circuit 12. The end terminals of the secondary winding 37 are connected to the anodes of the valves 32 and 33, respectively, and the cathodes of these valves are connected together and to one terminal of the resistor 35. Thus when electric valve 32 is rendered conductive, transformer primary winding 34 is shock excited during half cycles of voltage of the supply circuit having one polarity, and when electric valve 33 is rendered conductive the winding is shock excited with an impulse of voltage during half cycles of voltage of the supply circuit having the opposite polarity. The resistor 36 in series with primary winding 34 serves to adjust the magnitude of the voltage peak. The electric valves 32 and 33 are preferably of the gas-filled type and, as illustrated, each comprises a control member or grid 40 and a shield grid 41 which is connected directly to the cathode bus. A transient suppressing capacitor 42 is preferably connected between the control grid and the cathode of each of the valves.

The instant of initiation of conduction of electric valves 32 and 33 is controlled by the combination of an alternating current component of voltage and a direct current component of voltage which may be varied in magnitude to regulate an electrical condition of the load circuit. The alternating current component of voltage preferably lags the anode voltage of valves 32 and 33 by substantially ninety degrees, and in the illustrated embodiment of the invention is derived from the alternating current circuit 12 by means of a midtapped secondary winding 43 of the transformer 38. The midtapped winding 43 forms two legs of a phase shifting bridge which is completed by a resistor 44 and a capacitor 45 connected in series between the end terminals of the winding 43. The alternating current component of voltage for energizing the control grids 40 of electric valves 32 and 33 is impressed across resistors 46 and 47 which are connected in series and between the midpoint of winding 43 and the common terminal of resistor 44 and capacitor 45. The common terminal of resistors 46 and 47 is connected to one side of a direct current voltage supply illustrated by conductors 48 and 49 and which may to advantage be energized in accordance with the output of the voltage or current regulator which has been schematically illustrated on the drawing. A regulator circuit particularly adapted for this type of control is described and claimed in my copending application Serial No. 480,150, filed March 23, 1943, and which is assigned to the assignee of the present application. The conductor 49 of the direct current circuit is connected to the cathodes of electric valves 32 and 33 to complete the circuits of the control members. The control member 40 of electric valve 32 is connected with the other terminal of resistor 46 through a current limiting resistor 50 and a second resistor 51. Similarly, the control member of electric valve 33 is connected with the other terminal of the resistor 47 through current limiting resistor 52 and a second resistor 53. It will be understood that the regulator operates to vary the magnitude of the voltage impressed on conductors 48 and 49 to maintain the voltage or current of the load circuit constant and of the magnitude for which the regulator circuit has been adjusted.

In supplying alternating current to inductive loads, such as a welding transformer, by means of reversely connected electric valves, it is essential that the voltage of the control member be more positive than the critical voltage which exists at the same instant that the anode is positive with respect to the cathode. When employing periodic voltages of steep wave front and having a relatively short duration with respect to the frequency of the alternating current circuit, it is essential that the peaked voltages occur after the anode voltage has reversed on the electric valve which is next to be rendered conductive; that is, the peaked voltage must occur at a point corresponding to the load current zero as established by the power factor angles; or at a later instant if less than full heat is required. In accordance with the present invention, I provide a novel restraining circuit for preventing the application of the periodic voltages of peaked wave form to the control members of electric valves 10 and 11 until the anode-cathode voltage of the valve to be rendered conductive next is reversed. In the particular embodiment illustrated, this circuit includes means for supplying additional excitation voltages to the control members of the electric valves 32 and 33 to maintain these valves non-conductive until the current through the welding transformer has ceased to flow regardless of the excitation voltage produced by the direct current circuit 48—49 and the alternating current voltage appearing across resistors 46 and 47.

The restraining circuit includes an electric discharge device 54 having a pair of discharge paths provided by a pair of anodes 55 and 56 and a cooperating cathode 57. The cathode is connected directly with the cathodes of electric valves 32 and 33, while the anodes 55 and 56 are connected respectively with the control members 40 of electric valves 32 and 33. The circuit between the anode 55 and the control member 40 of electric valve 32 is completed through a secondary winding 57' of the transformer 58, a secondary winding 59 of the transformer 37 and the current limiting resistor 50. In like manner, the circuit between anode 56 and the control member 40 of electric valve 33 is completed through a transformer secondary winding 60 of transformer 58, the secondary winding 61 of transformer 38 and the current limiting resistor 52. Windings 59 and 61 provide a small alternating current component of voltage which is in phase with the anode voltages of electric valves 32 and 33, respectively. The transformer 58 is provided with a primary winding 62 which is energized in accordance with the voltage appearing across the primary winding of welding transformer 13 to provide a component of voltage in the windings 57' and 60 which is in phase opposition with the voltage produced by windings 59 and 61 and which is of greater amplitude. As long as welding current is flowing in the primary of transformer 13, the voltage of windings 57' and 60 is larger than the voltage produced by windings 59 and 61, and during the region of the alternating current supply voltage during which the voltage across the primary of transformer 13 has reversed the discharge paths of electric valve 54 are conducting and the resultant negative voltages produced by the windings 57' and 59 and 60 and 61 are impressed on the control members of electric valves 32 and 33, respectively. As soon as the current through the welding transformer ceases to flow, the voltage produced by windings 57' and 60 temporarily drops to zero or becomes positive and valve 54 is extinguished, returning control of electric valves 32 and 33 to the excitation circuit including the alternating current components of resistors 46 and 47 and the unidirectional component appearing across conductors 48 and 49. In this way, the restraining valve 54 and the associated transformer windings, which respond to the voltage across the main valve means 10 and 11 or, from another point of view, which are controlled in accordance with the load current, operate to preclude conduction of electric valves 32 and 33 prior to the time that the anode of the valve means 10 or 11 which is next to conduct has become positive regardless of the action of the regulating or heat control voltage that may appear across conductors 48 and 49.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. An alternating current supply circuit, an inductive load circuit, electric translating apparatus interconnecting said circuits including a pair of electric valve means reversely connected in parallel for transmitting alternating current to said load circuit, said electric valve means each being provided with an anode, a cathode and a control member for controlling the conductivity thereof, means for energizing said control member of each of said electric valve means with a periodic voltage of peaked wave form to determine the instant in the voltage wave of said supply circuit that said electric valve means are rendered conductive, and means for insuring the intended application of said periodic voltage of peaked wave form to said control member of one of said valve means during the half cycle of voltage of said supply circuit when conduction of the other of said electric valve means ends and at an instant not earlier in said half cycle of voltage than the termination of conduction of said other of said electric valve means, said means operating in response to conduction of said other of said electric valve means to delay the occurrence of said voltage of peaked wave form when operation of said last mentioned means would otherwise supply said voltage of peaked wave form at a time prior to the power factor angle of said load circuit.

2. An alternating current supply circuit, a load circuit, electric translating apparatus interconnecting said circuits including a pair of electric valve means reversely connected in parallel for transmitting alternating current to said load circuit, said electric valve means each being provided with an anode, a cathode and a control member for controlling the conductivity thereof, means for energizing said control member of each of said electric valve means with a periodic voltage of peaked wave form to determine the instant in the voltage wave of said supply circuit that said electric valve means is rendered conductive, and means energized in accordance with the voltage across the anode-cathode circuits of said electric valve means for preventing positively the application of said periodic voltage of peaked wave form to said control members of both of said electric valve means prior to the time that said anodes thereof becomes positive.

3. An alternating current supply circuit, a load circuit, electric translating apparatus interconnecting said circuits including a pair of electric valve means reversely connected in parallel for transmitting alternating current to said load circuit, each of said electric valve means having an anode, a cathode, and a control member, means for energizing said control members with a periodic voltage of peaked wave form comprising an electric valve, a source of voltage and a transformer having the primary winding connected in series with said source of voltage and the anode-cathode circuit of said electric valve, means for controlling the conductivity of said electric valve to determine the instant at which the primary winding of said transformer is energized, and means responsive to the voltage across the anode-cathode circuits of said electric valve means for preventing conduction of said electric valve before the anode voltage of said electric valve means which is to conduct next becomes positive.

4. An alternating current supply circuit, a load circuit, electric translating apparatus interconnecting said circuits including reversely connected electric valve means for transmitting alternating current to said load circuit, said electric valve means each including an anode, a cathode and a control electrode, a phase shifting circuit for energizing said control electrodes with a periodic voltage of peaked wave form comprising an electric valve having an anode, a cathode and a control member, and a transformer including a primary winding, means connecting the primary winding of said transformer in circuit with the anode-cathode circuit of said electric valve and for energization in accordance with the voltage of said alternating current supply circuit, means for impressing a variable voltage on the control member of said electric valve to determine the instant of conduction thereof and as a result the phase position of the periodic voltage produced by said transformer, means for producing a voltage having a characteristic which changes at the instant the anode-cathode voltage of a nonconducting one of said electric valve means reverses, and means for selectively energizing the control member of said electric valve in accordance with said variable voltage and said last mentioned voltage to prevent the application of said peaked voltage to the control member of said electric valve means before the anode voltage thereof becomes positive.

5. An alternating current supply circuit, a load circuit, electric translating apparatus interconnecting said circuits including reversely connected electric valve means for transmitting alternating current to said load circuit, said electric valve means each including a control member, a phase shifting circuit for energizing said control members with a periodic voltage of peaked wave form comprising an electric valve having an anode, a cathode and a control member, and a transformer including a primary winding, means connecting the primary winding of said transformer in circuit with the anode-cathode circuit of said electric valve and for energization in accordance with the voltage of said alternating current supply circuit, means for impressing a variable voltage on the control member of said electric valve to determine the instant of conduction thereof and as a result the phase position of the periodic voltage produced by said transformer, means for producing a voltage having a characteristic during conduction of one of said valve means which changes as the anode-cathode voltage of the other of said valve means becomes positive, and means for selectively energizing the control member of said electric valve in accordance with the voltages of said last two mentioned means to prevent application of said periodic voltage of peaked wave form to the control member of the other of said electric valve means prior to the instant that the anode voltage of said other electric valve means becomes positive.

6. An alternating current supply circuit, an inductive load circuit, electric translating apparatus interconnecting said circuits including a pair of electric valve means reversely connected in parallel for transmitting alternating current from said supply circuit to said load circuit, said electric valve means each being provided with an anode, a cathode and a control member for controlling the conductivity thereof, means for energizing said control member of each of said electric valve means with a periodic voltage of peaked wave form to determine the instant in the voltage wave of said supply circuit that said electric valve means are rendered conductive, and means responsive to the conduction of current by said electric valve means and effective whenever the instant of conduction determined by said last mentioned means occurs prior to the termination of conduction by each of said electric valve means for restraining the operation of said last mentioned means and thereby delaying the application of said periodic voltage of peaked wave form to the control member of either of said electric valve means while current is being conducted by the other of said electric valve means.

7. An alternating current supply circuit, an inductive load circuit, electric translating apparatus interconnecting said circuits including a pair of electric valve means reversely connected in parallel for transmitting alternating current to said load circuit, each of said electric valve means having an anode, a cathode and a control member, means for energizing said control member of each of said electric valve means with a periodic voltage of peaked wave form, said means comprising a phase shifting circuit including an electric valve having a control member, means for impressing a voltage on the control member of said electric valve which will render said electric valve conductive and thereby determine the phase position of the application of said peaked voltage to the control members of said electric valve means, and means for delaying conduction of said electric valve and the resultant release of said peaked voltage to the control members of said electric valve means until the instant that the anode voltage of said electric valve means to be rendered conductive next has become positive, said means being responsive to conduction by said electric valve means and effecting energization of the control member of said electric valve independently of said last mentioned voltage whenever said last mentioned means becomes operative to supply said peaked voltage to the control members of said electric valve means prior to the time that the anode voltage of said electric valve means to be rendered conductive next has become positive.

BENJAMIN COOPER.

REFERENCES CITED

The following references are of record in the file of this patent:

UNITED STATES PATENTS

| Number | Name | Date |
| --- | --- | --- |
| 2,151,749 | Dawson | Mar. 28, 1939 |
| 2,151,753 | Etzrodt | Mar. 28, 1939 |
| 2,231,582 | Knight et al. | Feb. 11, 1941 |
| 2,220,077 | Coffin | Nov. 5, 1940 |
| 2,234,963 | Coffin | Mar. 18, 1941 |
| 2,283,719 | Bivens | May 19, 1942 |
| 2,295,635 | Collom | Sept. 15, 1942 |
| 2,303,453 | Gulliksen | Dec. 1, 1942 |